US008133118B2

(12) United States Patent
Borissov

(10) Patent No.: US 8,133,118 B2
(45) Date of Patent: Mar. 13, 2012

(54) COMBINED MUSICAL INSTRUMENT AND GAMING DEVICE

(76) Inventor: Milo Borissov, Dubai Sports (AE)

(*) Notice: Subject to any disclaimer, the term of this patent is extended or adjusted under 35 U.S.C. 154(b) by 1079 days.

(21) Appl. No.: 11/899,957

(22) Filed: Sep. 6, 2007

(65) Prior Publication Data

US 2009/0069085 A1 Mar. 12, 2009

(51) Int. Cl.

*G06F 17/00* (2006.01)
*G06F 19/00* (2011.01)
*A63F 9/24* (2006.01)
*A63F 13/00* (2006.01)

(52) U.S. Cl. ................. 463/35; 463/1; 463/16; 273/309

(58) Field of Classification Search .................... 463/16, 463/25, 26, 46, 1, 30–35; 206/315.1; 248/917; 312/223.1; 361/679.01–679.61; D21/397; 273/274, 138.1, 309; 446/397; 84/174, 177–255
See application file for complete search history.

(56) References Cited

U.S. PATENT DOCUMENTS 4,614,342 A * 9/1986 Takashima ...................... 463/11
4,906,005 A * 3/1990 Manabe .......................... 463/22
5,174,639 A * 12/1992 Wong ......................... 312/351.3
5,588,650 A * 12/1996 Eman et al. ............... 273/142 B
5,655,966 A * 8/1997 Werdin et al. .................. 463/25
5,726,368 A * 3/1998 Shaw ............................. 84/190
6,084,167 A * 7/2000 Akimoto et al. ............ 84/477 R
6,688,984 B2 * 2/2004 Cole .............................. 463/46
7,156,735 B2 * 1/2007 Brosnan et al. ................ 463/16
7,311,598 B2 * 12/2007 Kaminkow et al. ............ 463/16
2002/0090988 A1 * 7/2002 Frost et al. ...................... 463/17
2002/0183106 A1 * 12/2002 Cole .............................. 463/16
2005/0049049 A1 * 3/2005 Griswold et al. ............... 463/46
2005/0204908 A1 * 9/2005 Uehara ........................... 84/746
2006/0195869 A1 8/2006 Holm et al.

FOREIGN PATENT DOCUMENTS

JP 2-195909 8/1990

OTHER PUBLICATIONS

Fey, Marshall. "Slot Machines: A Pictorial History of the First 100 Years". Copyright 1983. pp 158-159.*

* cited by examiner

*Primary Examiner* — Milap Shah
(74) *Attorney, Agent, or Firm* — Weide & Miller, Ltd.

(57) ABSTRACT

One or more gaming machines are associated with a musical instrument. The musical instrument has a housing and one or more elements for generating sound. The musical instrument may comprise a piano having keys located at one end and housing a plurality of strings. Each gaming machine is configured to display gaming information via a display. In one embodiment, each gaming machine has a housing which is housed at least partially within the housing of the musical instrument. The gaming machines may comprise terminals or stations associated with a roulette wheel for presenting a roulette game.

13 Claims, 4 Drawing Sheets

COMBINED MUSICAL INSTRUMENT AND GAMING DEVICE

FIELD OF THE INVENTION

The present invention relates to gaming devices or machines and, more particularly, one or more gaming devices or machines associated with a musical instrument.

BACKGROUND OF THE INVENTION

Gaming continues to grow in popularity. The impetus of most development in the gaming field has been upon new and exciting games. For example, games have been developed that include bonuses or progressives. In addition, themed games continue to be developed and promoted.

All of these existing games, however, generally suffer from the same drawback that game play is substantially a solitary activity. In particular, the games are presented by gaming machines which are configured to be played by a single player. So configured, while there may be hundreds or thousands of players at a gaming machine, the players all play individual machines. While each player may be seated close to another player spatially, those players are relatively isolated in a social sense.

SUMMARY OF THE INVENTION

One aspect of the invention is a gaming unit comprising at least one gaming machine associated with a musical instrument. In one embodiment, the musical instrument comprising a housing and at least one element configured to generate sound. The musical instrument might comprise a piano having keys and a plurality of strings.

In one embodiment, each gaming machine comprises a controller configured to generate game information and a display for displaying information generated or provided by the controller. The gaming machine may be configured to present wagering games in response to one or more wagers. The gaming machine further comprises a housing configured to support or house one or more elements of the gaming machine, such as the controller and display.

The gaming machines may be configured to present one or more games. Such games may comprise video slot, spinning reel slot, video poker and other games. In a preferred embodiment, the gaming machines present a roulette game, and gaming unit further comprising a roulette wheel. The roulette wheel is preferably mounted to the housing of the musical instrument.

In a preferred embodiment, the housing of the musical instrument houses at least a portion of each gaming machine. In one embodiment, a portion of the housing of each gaming machine is located in the housing of the musical instrument. In one embodiment, the housing of the musical instrument has a top deck having a plurality of openings and the gaming machines extend into an interior of the housing of the musical instrument through the opening(s).

In accordance with the invention, the gaming unit defines a new and unique environment for gaming. This environment allows players to interact with one another in a social environment.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is the combination of at least one gaming machine and at least one musical instrument. As detailed below, the invention may have a variety of configurations. In general, however, the invention represents a new configuration and environment for gaming machines.

Figure 1:
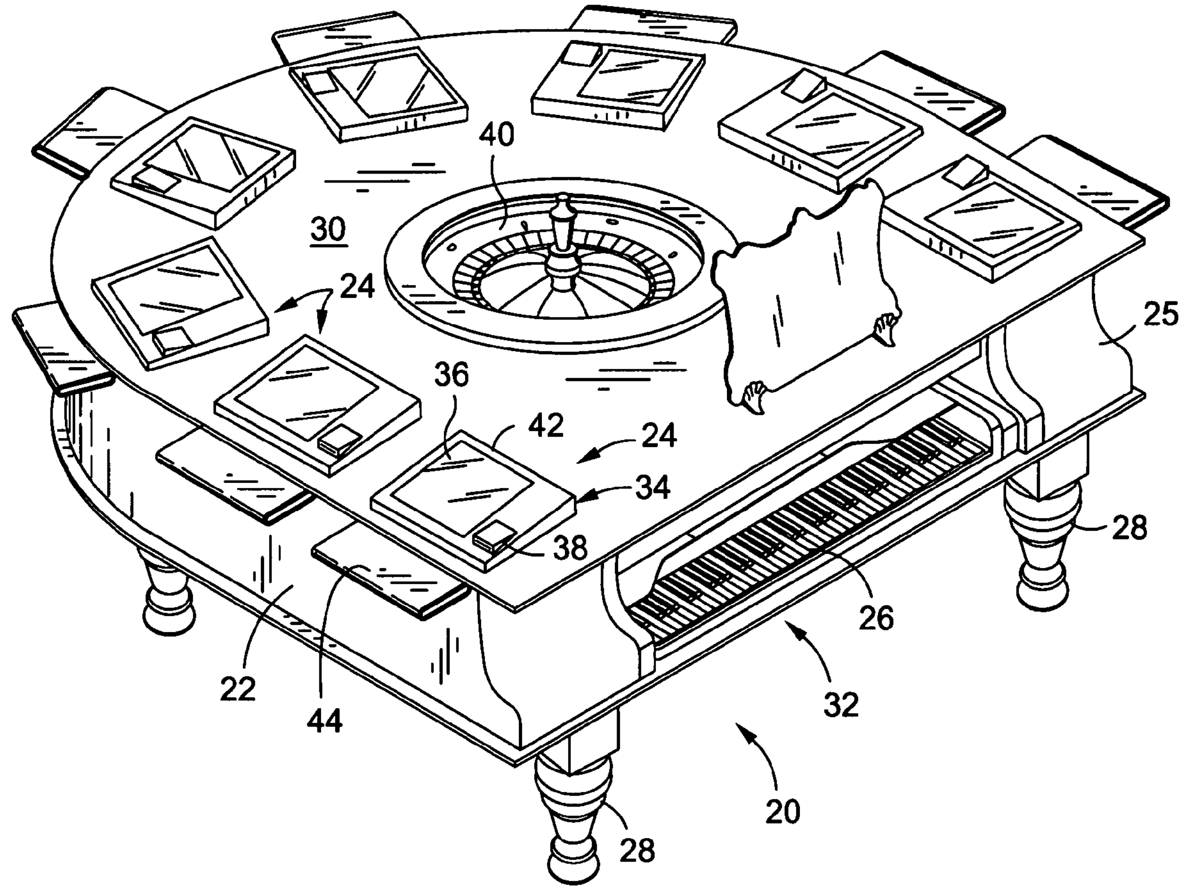
FIG. 1 illustrates a combined musical instrument and gaming device in accordance with an embodiment of the invention.

FIG. 1 illustrates a gaming device or unit 20 in accordance with one embodiment of the present invention. As illustrated, the gaming device 20 comprises a musical instrument 22 and one or more gaming machines 24.

The musical instrument 22 may be of a variety of types and configurations. In one embodiment, the musical instrument 22 has or is associated with a housing 25. In a preferred embodiment, for example, the musical instrument 22 may be a piano. The piano has a housing 25 which contains and/or supports various components well known in the art of pianos. Preferably, the musical instrument is configured to generate sound in response to play by a player. In this regard, the piano thus preferably comprises one or more keys 26 which may be actuated by a player. As is known in the art, the keys may actuate hammers which strike corresponding strings, creating sound.

As indicated, piano may have a variety of configurations. For example, the shape of the piano might vary. As illustrated, the piano has a "grand piano" configuration, in which the strings extend horizontally within the housing 25. In this configuration, the housing 25 defines an interior space in which the strings and various other components are housed. This housing 25 is supported by a plurality of legs 28. The housing 25 has a generally planar deck or top 30. The keys 26 are located at a front end 32 of the housing 25.

The piano might have other configurations, such as upright or other configurations. Further, the piano might be supported in other manners, such as with supports other than legs.

In accordance with the invention, one or more gaming machines 24 are associated with the musical instrument 22. In a preferred embodiment, the one or more gaming machines 24 are associated, at least in part, with the housing 25.

In one embodiment, the gaming machine 24 comprises a housing 34 for enclosing/supporting various components of the gaming machine. The housing 34 may have a variety of configurations. In one embodiment, the housing 22 is configured so the machine has a "drop in" or "bar-top" type format.

In such a configuration, the housing 22 is box-like, and with various components accessible or viewable at the top thereof.

The gaming machine 24 may be configured to present one or more games. In one embodiment, the gaming machine 24 is configured as a "video" type gaming machine, the machine including at least one display 36 for displaying game information to a player.

The gaming machine 24 may include other means for providing information to a player. For example, speakers (not shown) or other devices may be provided for generating sound associated with the game. The gaming machine 24 may also include lights, printed instructions and other displays/display devices. In one embodiment, these devices may be physically associated with the gaming machine 24 (such as by being connected to or located within the housing 34 thereof), or they might be associated with the musical instrument 22 (such as the housing 25 thereof).

In one embodiment, a player must make payment in order to be entitled to play a game. Preferably, the game is presented as a wagering type game, and a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming machine 24 may include a bill validator/acceptor 38 for accepting paper currency. Other means for providing value or making payment, such as a coin acceptor for accepting coins, a credit card reader, a smart card reader, a ticket reader or the like, may be provided.

In one embodiment, an award of winnings may be paid to the player in the form of credits associated with a printed ticket (not shown), or value associated with a card or other media. In other embodiments, the gaming machine 24 could be configured to dispense coins to a player via a coin tray.

Preferably, the gaming machine 24 includes means for a player to provide input. In a preferred embodiment, this comprises a touch screen associated with the display 36 (such as overlying the display). The one or more input devices might also comprise one or more buttons, such as a plurality of reel "spin" or "select" buttons, a "bet one" button and a "max bet" button for a player to select the amount to bet on a particular game.

A game controller (not shown) is provided for controlling the various devices of the gaming machine and for providing game information. For example, the game controller may be arranged to generate video and audio data for presentation by the display and speakers of the gaming machine 24. The game controller may be arranged to detect a signal from the value input device(s) (such as coin acceptor, bill validator, ticket reader, etc.) for registering credits corresponding to those inputs, for subtracting credits for wagers placed by a player, and for cashing the player out (paying credits with coins via a coin delivery mechanism, printing a ticket or the like).

Preferably, the one or more player input devices provide an output to the gaming controller for use in play of the game. For example, in response to a "bet one" input by a player, the gaming controller is preferably transmitted a signal which causes the gaming controller to initiate presentation of the game.

It will be appreciated that the gaming machine 24 may have a variety of configurations, and that the gaming machine 24 illustrated and described above is but an example of a device for implementing the game of the present invention. For example, in one or more embodiments, the gaming machine 24 may be associated with a network and receive game information remotely and may transmit information, such as payout and game play information, to a remote location. For example, a remote master controller or server may generate game information which is transmitted over a communication link to the gaming machine 24. That information may be utilized by a local controller or processor to present the game, such as by displaying game play data or information. Such information might comprise graphical images of simulated spinning reels (as in the case of a video slot game), images of cards (as in the case of a video poker or other card game) or other symbols or indicia (such as dice indicia or the like).

As indicated, in one embodiment, game information is displayed by a video display 36 to a player. That display may be of a variety of types, including CRT, LCD, plasma and others. The gaming machine 24 may also include more than one video display.

In another embodiment, the gaming machine 24 may include one or more physical reels capable of displaying symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference.

The gaming machine 24 may have other configurations, including other features. For example, the gaming machine 24 may include a player tracking device, such as a card reader and associated keypad. Such player tracking devices are well known and may permit the game operator to track play of players of the gaming machine. The tracked play may be utilized to offer player bonuses or awards.

As indicated, in one embodiment, the gaming machine 24 may be configured to dispense media, such as printed paper tickets, which have associated value. For example, winnings or unused credits may be returned to the player via a printed ticket having value or associated value. In one embodiment, the gaming machine 24 might also be configured to accept such media for providing credit for game play. Such systems are well known and thus not described in detail herein.

In a preferred embodiment of the invention, as illustrated in FIG. 1, the gaming machine 24 is configured to present at least a roulette game. In this configuration, the gaming machine 24 is associated with a roulette wheel 40, the roulette wheel 40 mounted to the housing 25 of the musical instrument 22. In a preferred embodiment, the roulette wheel 40 is automatically controlled, such as via a master gaming controller (which may be housed in the housing 25 of the musical instrument 22 or elsewhere). The individual gaming machines 24 and roulette wheel 40 are interfaced, whereby bets may be placed, the wheel 40 may be rotated, and results posted to the players of the gaming machines. Such an automatic roulette wheel is described in WO 03/051476A1. In this configuration, each gaming machine 24 may comprise a wagering kiosk or roulette terminal via which wagers may be placed and roulette game outcomes presented. In such a configuration, the gaming terminals may be configured to display roulette betting areas. In other embodiments, the roulette wheel could be manually or "dealer" controlled. In such event, the outcome might be determined by an optical reader or be input by the dealer to a controller linked to the terminals. It is also noted that the roulette wheel could be remotely located, rather than be specifically associated with the housing of the musical instrument. For example, a remote roulette wheel might be located in one area of a casino and be linked to a plurality of gaming units in accordance with the invention, those units located in other areas of the casino.

In a preferred embodiment, the housing 25 of the musical instrument 22 houses at least a portion of the gaming machines 24. In the embodiment illustrated, openings are defined in the top or deck 30 of the musical instrument housing 25. These openings lead to the interior of the housing 25. In the illustrated configuration, the housing 34 of each gaming machine 24 extends downwardly through a corresponding opening in the deck 30 of the musical instrument housing 25. A portion of the gaming machine housing 34 is thus located in the interior of the musical instrument housing 25. As illustrated, a top portion of each gaming machine 24 extends above the deck 30. This includes a frame or bezel portion 42. The one or more displays 36 are visible at the top of the gaming machine 24, and the various inputs (such as bill validator/ticket reader 38) are accessible at the top of the gaming machine 24.

The invention may include additional features and elements. For example, as illustrated, a bumper or arm rest 44 may be located adjacent each gaming machine 24. In one embodiment, each arm rest 44 comprises a support which extends outwardly from the housing 25 of the musical instrument 22. Preferably, at least a top and front portion of the arm rest 44 is padded for comfort. Of course, the configuration of the arm rest 44, including its manner of attachment/support and the materials from which it is constructed, may vary. In one embodiment, for example, the arm rest 44 might comprise an extension of the deck 30 of the musical instrument housing 25.

As illustrated, five gaming machines 24 are associated with the musical instrument 22. The particular number of gaming machines 24 and their location may depend at least in part upon the size of the gaming machines 24 and the size and shape of the musical instrument housing 25. For example, the musical instrument housing 25 might be oversized (relative to the normal size of a housing of a plain musical instrument) in order to fit additional gaming machines. Further, the shape of the housing 25 might be altered to fit additional gaming machines, though in a preferred embodiment, the shape of the normal musical instrument is maintained.

It will be appreciated that the invention may have a variety of configurations and variations.

Figure 2:
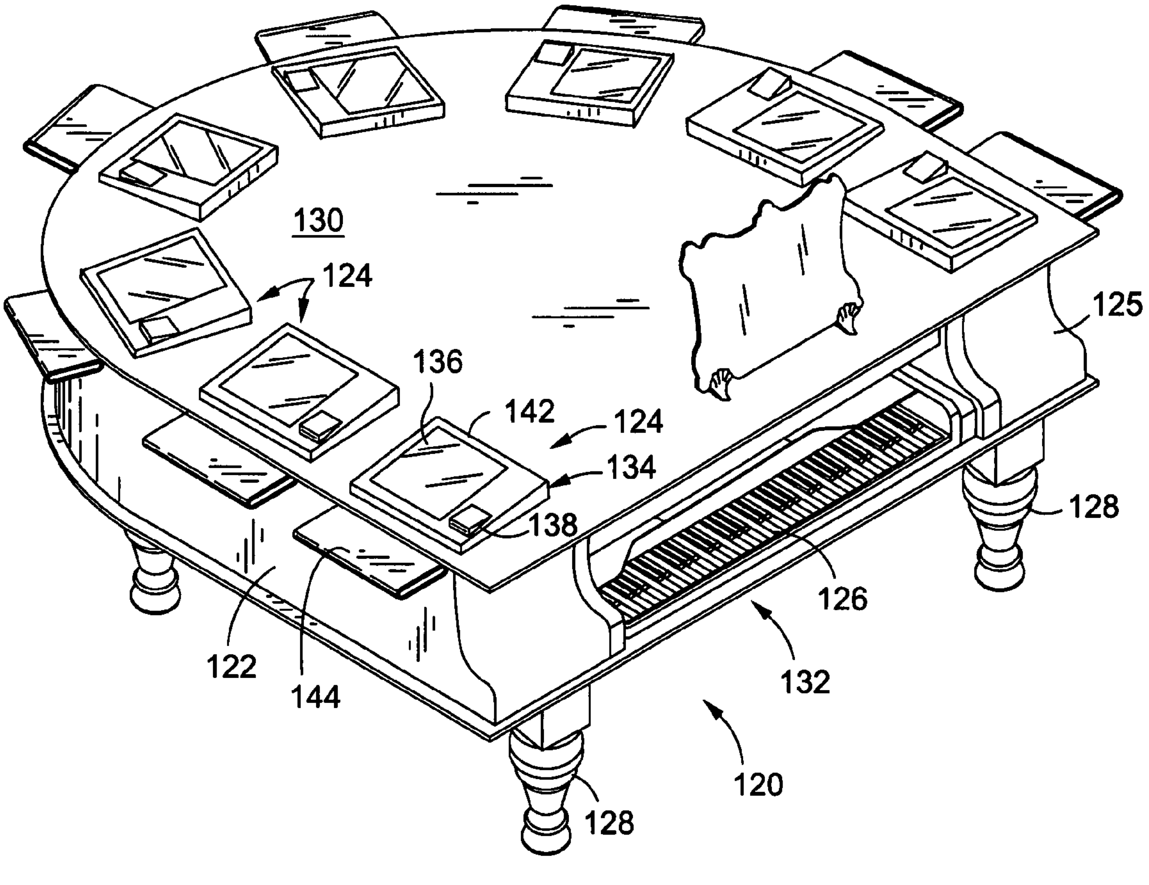
FIG. 2 illustrates a combined musical instrument and gaming device in accordance with another embodiment of the invention.

In one embodiment, the gaming machines which are associated with the musical instrument need not be configured to present a roulette type game and thus a roulette wheel need not be included. Such a configuration is illustrated in FIG. 2. In another embodiment, the roulette wheel could be remotely located from the musical instrument. As illustrated in this configuration, the invention again comprises a musical instrument 122 and one or more gaming machines 124. In this embodiment, the gaming machines 124 are configured to present games such as video poker, keno, video slots, bingo, or other games, and even roulette games where the roulette wheel is not associated with a housing 125 of the musical instrument 122.

Figure 3:
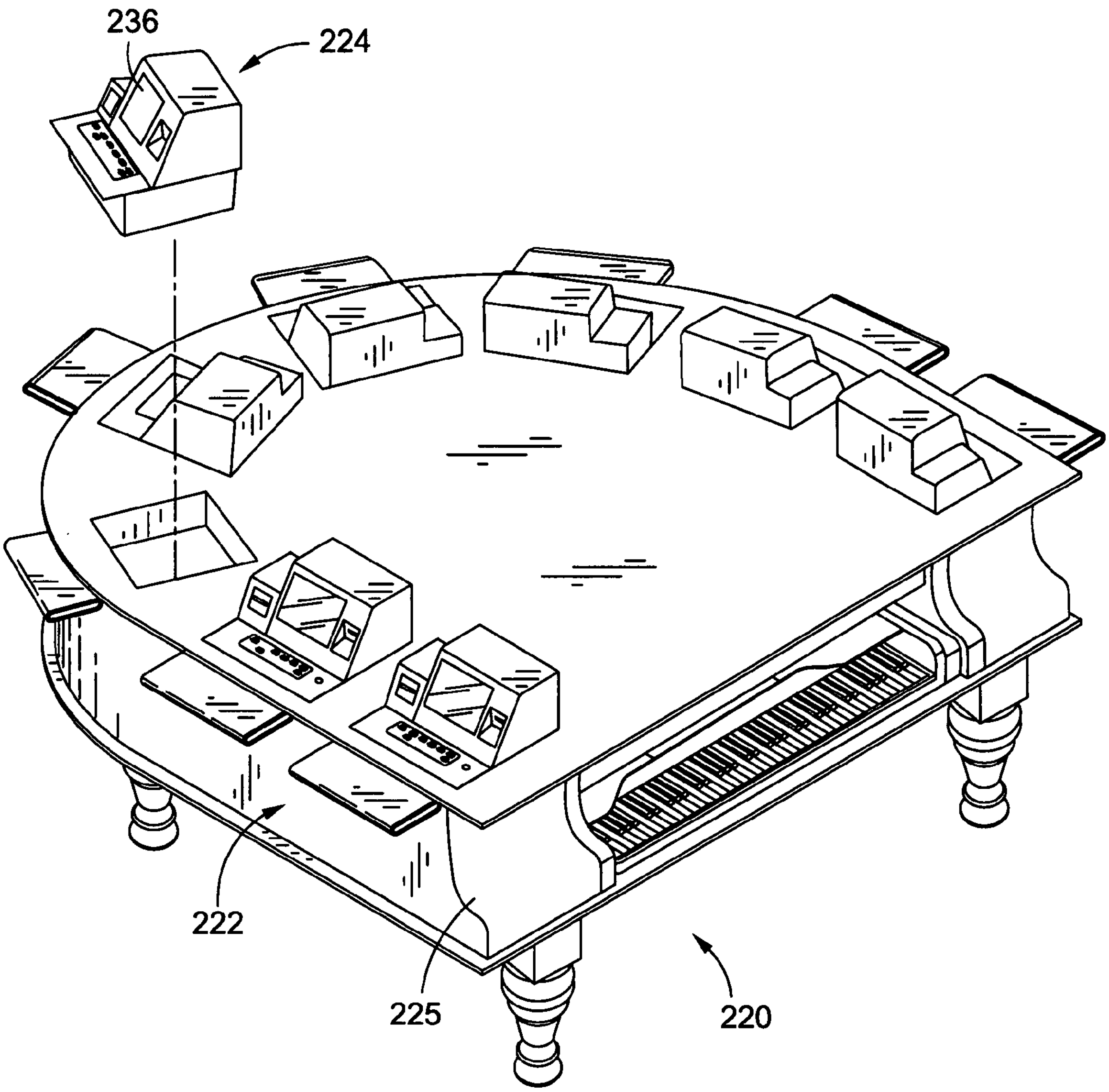
FIG. 3 illustrates a combined musical instrument and gaming device in accordance with yet another embodiment of the invention.

FIG. 3 illustrates yet another embodiment of the present invention. In this configuration, the invention again comprises a musical instrument 222 and one or more gaming machines 224. In this embodiment, the gaming machines 224 are "slant-top" in their design. In particular, the top of each gaming machine 224 extends upwardly, such that the one or more displays 236 thereof generally face the player. In this configuration, a lower portion of the housing of each gaming machine 224 may again be extended through an opening in the musical instrument housing 225. However, the upwardly extending configuration of each gaming machine 224 provides additional privacy to each player at the musical instrument 222 (such as providing some shielding of the player's game play, wagering and the like).

In this regard, it is again noted that the configuration of the gaming machine(s) which is associated with the musical instrument may vary. For example the gaming machine could be configured so that the top thereof is generally flush with the deck of the musical instrument housing. In other embodiments, the top of the gaming machine could even be partially inset into the housing.

Figure 4:
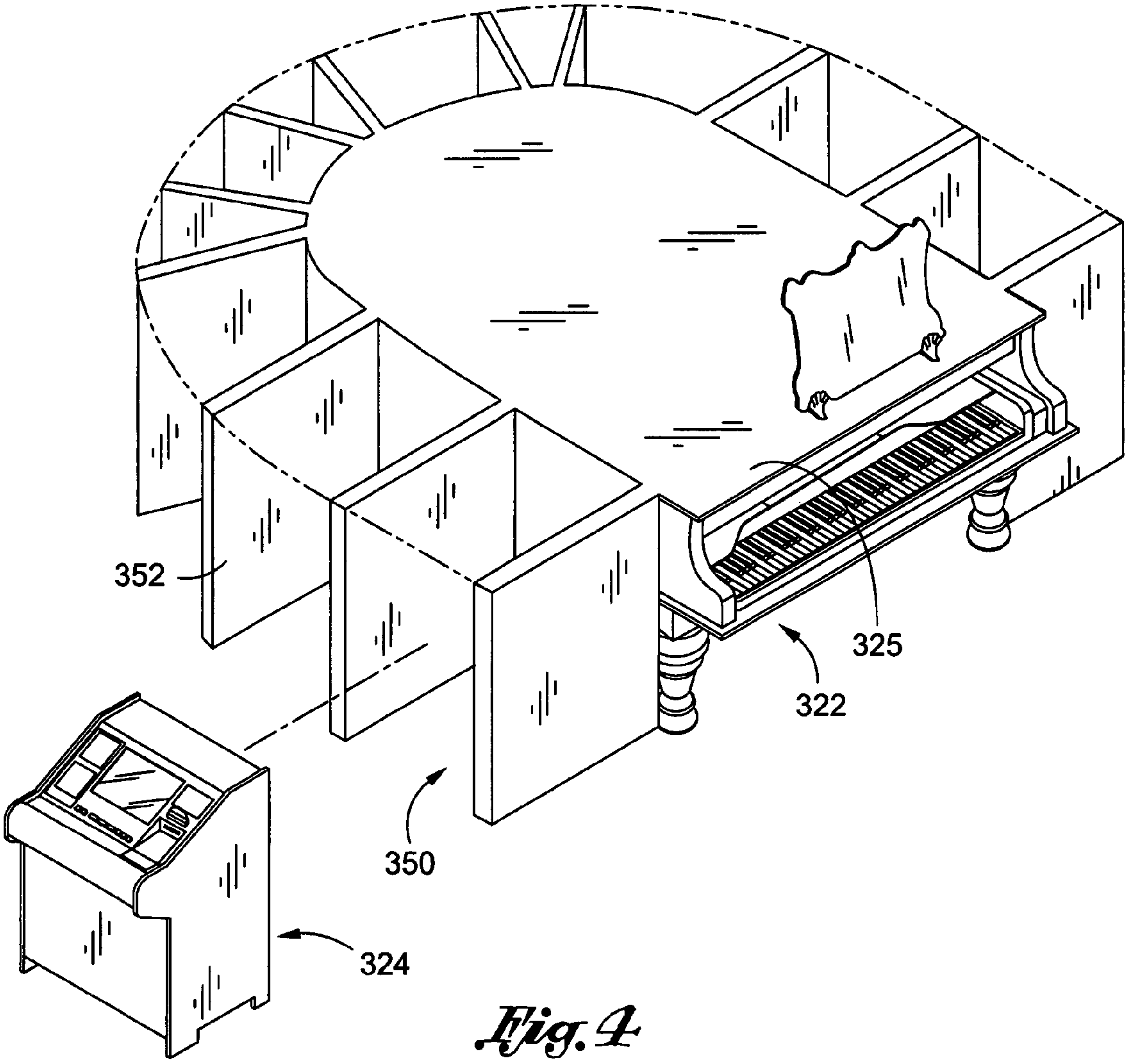
FIG. 4 illustrates a combined musical instrument and gaming device in accordance with yet a further embodiment of the invention.

FIG. 4 illustrates yet another embodiment of the invention comprising a musical instrument 322 and one or more gaming machines 324. In this embodiment, the musical instrument 322 again comprises a housing 325. In this embodiment, the musical instrument 322 again comprises a piano, and thus the housing 325 is piano-shaped. As illustrated, however, the housing 325 is configured to be sufficiently large to define one or more insets 350 for accepting one or more gaming machines 324. As illustrated, the housing 325 defines a plurality of insets 350 around its outer edge or periphery (except at a front, where keys 326 are located). Each inset 350 is configured to accept therein a gaming machine 324. Each gaming machine 324 preferably again is configured to present one or more games or game information, in a manner such as that detailed above. In the illustrated configuration, a housing 334 of each gaming machine 324 is configured to support the gaming machine in substantially free-standing arrangement or orientation. For example, the housing 324 may thus act as a base which supports the various elements of the gaming machine in a manner similar to that of conventional gaming machines.

As illustrated, each gaming machine 324 is associated with the musical instrument housing 325 so that the musical instrument 322 and one or more gaming machines 324 essentially comprise a single unit. As illustrated, inserts 352 or dividers may be located between various of the gaming machines 324 in order to complete the unitary or assembled look of the unit.

In this regard, in various embodiments, the gaming machines need not be directly attached to the musical instrument. In one embodiment, for example, the gaming machines might be associated with a table or other support, and that support might be connected to or be located adjacent the musical instrument.

It will be appreciated that the musical instrument need not be a piano or be limited to a piano. The musical instrument might comprise an electronic piano, organ or synthesizer, for example. Preferably, the musical instrument comprises at least one element for creating or generating sound. In the case of a piano, such may comprise the keys, hammers, strings and associated mechanisms. In one embodiment, the invention might comprise more than one musical instrument. For example, a housing might be configured to house two pianos having keys located at opposing ends and one or more gaming machines positioned along the opposing sides between the ends. In a preferred embodiment, the musical instrument is configured to be played by a player. However, the musical instrument could be configured to play automatically, such as in the case of a player piano. Music or other sound could also be generated remotely. For example, in one embodiment, one or more gaming machines may be associated with a housing that is piano-shaped. Music or other sound might be generated by an audio system which is located within the housing (rather than via keys and strings). In another embodiment, the music or other sound might be generated remotely, such as by an audio system which is located in the vicinity of the gaming unit. In such a configuration, speakers might be located in the housing or might be located in the area of the gaming unit. It will thus be appreciated that the music or other sound may be generated by a variety of mechanical, electro-mechanical or electronic devices. The musical instrument could also involve the play or participation by more than one player, such as two piano players, or one or more singers such as in the case of a karaoke device.

In one embodiment, music may be played or generated by the musical instrument independent of game play at the one or more gaming machines. In other embodiments, certain music or sounds could be generated in response to certain gaming events or activities, such as game outcomes, bonus modes or the like. In such a "linked" configuration, the musical instrument or other sound generating device may be coupled to the gaming machines or a master controller associated therewith in a control sense. For example, a player piano might be configured to be activated while the roulette wheel spins (such as by a signal received by the player piano from the master gaming controller which also controls the roulette wheel). In other embodiments, the playing or producing of certain music might trigger certain gaming events or activities, whether as to certain gaming machines or as to the community of gaming machines. For example, when certain music is played or generated, the gaming machines might be configured to offer certain bonus modes or the like.

Of course, the shape and configuration of the housing of the musical instrument may vary depending upon the instrument. It is also noted that the housing for the musical instrument may be one or more than one element. For example, in the configuration of a combined upright piano and one or more gaming machines, the upright piano may have a primary housing. It is also possible for the musical instrument to have a different shape or appearance than is customary. For example, the musical instrument might comprise a piano located in a poker-table shaped housing. A secondary or associated housing may be connected to the housing of the musical instrument or otherwise extend therefrom for supporting the one or more gaming machines. Such a secondary or associated housing might have a variety of shapes, such as comprising a table or bar-top. It will also be appreciated that the housing of the musical instrument may be constructed from a variety of materials and have a variety of finishes. For example, the housing may be constructed of wood (and for example, be tuned) and may have a painted or stained finish.

The one or more gaming machines associated with the musical instrument may have a variety of configurations and present a variety of games. As indicated, the gaming machines may be "stand alone" in the sense that a master gaming controller thereof is configured to present all of the games at that machine. As indicated above, in other embodiments, the gaming machines might be configured to be interconnected and/or receive game information from a remote location, such as a remote game server. Of course, the gaming machines 24 may be linked to external devices, such as an external power supply via a power cord, or player tracking and accounting (and other) servers via one or more communication links (wired or wireless). In one embodiment, various of such equipment may be housed at least partially within the interior of the housing of the musical instrument.

As indicated above, the one or more gaming machines may be associated with the musical instrument in a variety of ways. As indicated, in a preferred embodiment, at least a portion of a housing of the gaming machine is housed within the housing of the musical instrument. In other embodiments, at least a portion of the housing of the gaming machine is attached to the housing of the musical instrument. In the preferred embodiment in which the gaming machine includes a housing, security to the gaming machine components is ensured even if access is provided into the interior of the housing of the musical instrument. In other embodiments, it is possible for the housing of the musical instrument to be segmented into controlled areas, whereby access to those areas may be controlled. In such an embodiment, access may be controlled to the one or more areas housing the gaming machine(s).

A number of advantages and features of the invention will now be appreciated. In accordance with the invention, at least one gaming machine is associated with a musical instrument. The musical instrument thus comprises a new environment for gaming activities. For example, the combined musical instrument and gaming machine(s) may be located in a casino or bar. Players may gather around the musical instrument to hear music and participate in games. In this regard, game play involves a much greater "social" experience, making the gaming experience even more pleasurable. Music generated by the musical instrument contributes to an inviting and pleasing environment, further contributing to extended game play.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. In combination:

a piano comprising a piano housing and at least one element configured to generate sound in response to a player of the piano;

a gaming machine comprising:

a wager accepting device;

at least one display; and a game controller, said game controller configured to cause said display to display game information to a player of said gaming machine in response to a wager, at least a portion of said gaming machine housed within said piano housing; and at least one physical roulette wheel supported by said piano housing, wherein said gaming machine comprises a roulette game terminal configured to present a roulette game in conjunction with said roulette wheel.

2. The combination in accordance with claim 1, wherein said piano housing defines an interior space, one or more keys are located exterior to said piano housing and one or more strings are located in said interior space.

3. The combination in accordance with claim 1 wherein said wager accepting device comprises a reader configured to read paper currency and printed tickets.

4. The combination in accordance with claim 1 wherein said display comprises an LCD display.

5. The combination in accordance with claim 1 wherein said piano housing has a generally planar top and wherein said roulette wheel is located in said generally planar top of said piano housing.

6. The combination in accordance with claim 1 wherein said piano housing comprises a top deck and said one or more gaming machines extend into said top deck into an interior of said piano housing.

7. In combination:

a musical instrument comprising an instrument housing and at least one element configured to generate sound, wherein the musical instrument is a piano;

at least one gaming machine, said at least one gaming machine comprising:

a wager accepting device;

at least one display;

a controller configured to generate game information and present said game information on said display; and a gaming machine housing supporting said wager accepting device, said at least one display, and said controller, said gaming machine housing located at least partially within said instrument housing of said musical instrument; and a roulette wheel mounted to a generally planar top of said instrument housing of said musical instrument used in conjunction with said at least one gaming machine.

8. The combination in accordance with claim 7 wherein said housing of said musical instrument has a top, at least one opening in said top, and wherein said housing of said gaming machine extends through said opening into an interior space of said housing of said musical instrument.

9. In combination:

a piano having at least one music generating element located in a piano housing;

at least one gaming machine comprising:

a gaming machine housing;

a wager accepting device;

at least one display configured to display game information; and a game controller, said game controller configured to cause said at least one display to display game information in response to a wager; and a physical roulette wheel mounted to said piano housing, wherein said at least one gaming machine is configured to present a roulette game with said roulette wheel;

wherein, at least a portion of said gaming machine housing is located within said piano housing, but with said at least one display configured to be viewed by a first player located at said piano housing; and wherein, said piano is configured to generate music upon actuation by a second player independent of said at least one gaming machine, including the play of said at least one gaming machine.

10. The combination in accordance with claim 9 wherein said piano comprises one or more strings located in said piano housing and further comprises a plurality of keys for actuating said strings, said plurality of keys configured to be actuated by the second player.

11. The combination in accordance with claim 9 wherein said piano housing has a generally planar top surface and said roulette wheel is located in said top surface.

12. The combination in accordance with claim 9 wherein said piano housing has a generally planar top surface and said gaming machine housing extends into said generally planar top surface with said at least one display facing generally upwardly.

13. The combination in accordance with claim 9 wherein said piano housing defines a plurality of insets around an exterior thereof and a gaming machine housing is located in each inset.

* * * * *